United States Patent
Takayama

[11] 3,770,311
[45] Nov. 6, 1973

[54] EXHAUST PORT COVERS
[75] Inventor: James Takayama, Los Angeles, Calif.
[73] Assignee: The Raymond Lee Organization Inc., New York, N.Y.
[22] Filed: Feb. 9, 1972
[21] Appl. No.: 224,837

[52] U.S. Cl. .............. 296/1 R, D14/6 D, 180/64 A
[51] Int. Cl. ............................................ B60k 13/00
[58] Field of Search .................. 180/64 A; 296/1 R; 280/153 R; D14/6 D

[56] References Cited
UNITED STATES PATENTS
2,609,218  9/1952  Van Antwerp.................. 280/153 R
2,689,749  9/1954  Wise .............................. 280/153 R Primary Examiner—Kenneth H. Betts
Assistant Examiner—John A. Pekar
Attorney—Richard S. Shreve, Jr.

[57] ABSTRACT

Plates provided with brackets and hooks can be detachable secured to the rear of the body of a Volkswagon automobile to cover the exhaust ports exposed when exhaust headers have been installed.

1 Claim, 5 Drawing Figures

PATENTED NOV 6 1973  3,770,311

EXHAUST PORT COVERS

FIELD OF THE INVENTION

Volkswagon Beetle automobiles have two spaced ports in the rear of the body to accommodate twin tail pipes of the conventional exhaust system. When the system is modified to permit exhaust headers to be installed, the pipes are removed and the ports are exposed. The exposed ports are unsightly and, accordingly, I provide means for detachably sealing same.

To this end, I employ two plates, each shaped to be somewhat larger than the corresponding port to be sealed. Each plate carries a hook on its inner surface which detachably engages the top edge of the port. Each plate carries a bracket on its inner surface which extends at right angles and underneath the bottom of the rear of the body. Bolt securing means extend detachably through aligned holes in bracket and body. The means and hooks hold the plates firmly in sealing position to close off the ports and thus improve the appearance of the vehicle.

DETAILED DESCRIPTION OF PREFERRED EMBODIMENTS

Figure 1:
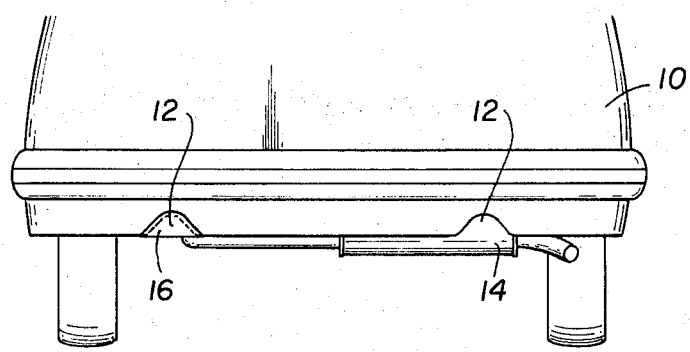
FIG. 1 is a rear elevation of a volkswagon beetle automobile showing my invention in use.
Figure 2:
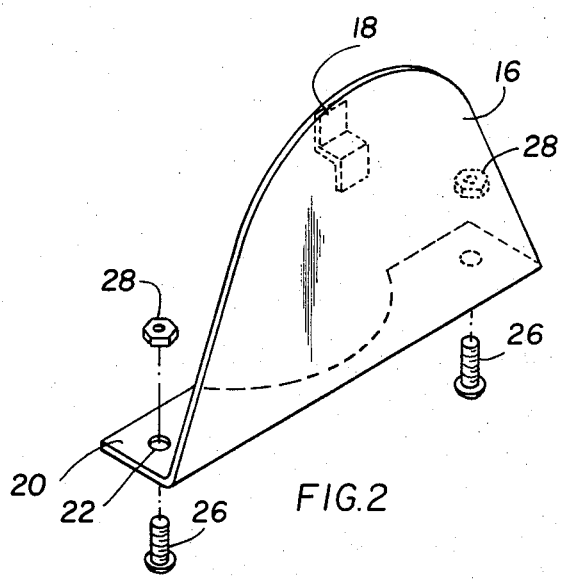
FIG. 2 is a perspective of a cover in accordance with my invention.
Figure 3:
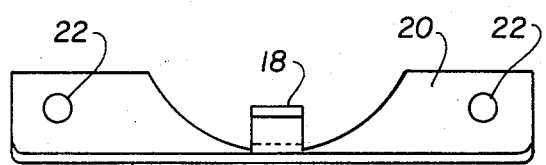
FIG. 3 is a top plan of the cover of FIG. 2.
Figure 4:
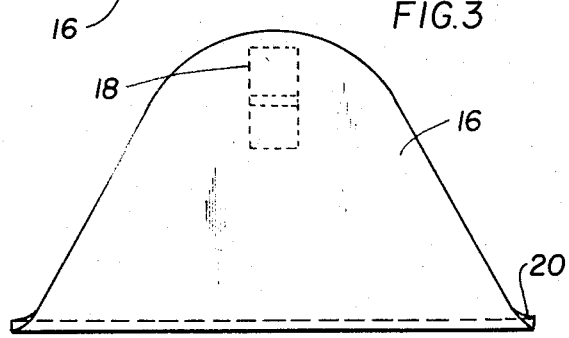
FIG. 4 is a side elevation of the cover of FIG. 2.
Figure 5:
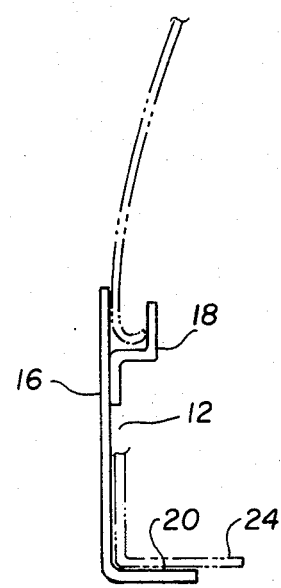
FIG. 5 is a detail cross section of the structure of FIG. 1.

Referring now to FIGS 1-5, a volkswagen beetle automobile has a body 10 with two spaced ports 12 at the rear which are exposed when an exhaust header 14 is installed.

To detachably seal each port I provide two plates 16 painted to match the body. Each plate has the same shape as the corresponding port but is somewhat larger. A small L shaped member 18 is welded or otherwise secured to the inside surface of the plate and points upward adjacent but below the top edge to define a hook. A flat elongated bracket 20 is welded or otherwise secured (or is integral with) the bottom horizontal edge of the plate and extends at right angles thereto. The bracket has end holes 22.

In use, the plate overlies the port with member 18 engaging the top edge of the port and bracket 20 extending underneath the bottom horizontal edge 24 of the body. The edge 24 has holes or slots aligned with holes 22 whereby bolts 26 can extend through the aligned holes and be held in position by nuts 28. The ports are thus sealed.

While I have described my invention with particular reference to the drawings, such is not to be considered as limiting its actual scope.

Having thus described this invention, what is asserted as new is:

1. In combination with an automobile having a body carrying two spaced exposed substantially triangular exhaust ports at the lower rear portion thereof which are exposed when an exhaust header is installed;

two cover plates each having the same general shape as the corresponding port but being somewhat larger;

securing means disposed on the inner surface of the corresponding plate and adapted to engage the body to cause the corresponding plate to overlie and close the corresponding port;

each securing means including an upwardly extending hook for engaging an upper edge of the corresponding port;

each plate having a bottom horizontal edge; and each securing means further including a bracket extending at right angles inwardly horizontally from the corresponding bottom horizontal edge to underlie said lower rear portion.

* * * * *